United States Patent [19]

Pheifer

[11] Patent Number: 5,683,130
[45] Date of Patent: Nov. 4, 1997

[54] UNDERWATER VEHICLE RECOVERY METHOD

[76] Inventor: Raymond N. Pheifer, Rte. 1, Box 158, Lerna, Ill. 62440

[21] Appl. No.: 663,411

[22] Filed: Jun. 17, 1996

[51] Int. Cl.⁶ .................................................. B66C 1/20
[52] U.S. Cl. ........................ 294/66.1; 294/74; 294/904; 294/82.14
[58] Field of Search ............................ 294/1.1, 66.1, 294/74, 82.14, 904; 280/402; 414/563; 410/19–22

[56] References Cited

U.S. PATENT DOCUMENTS

| | | |
|---|---|---|
| 504,055 | 8/1893 | Shaw . |
| 620,519 | 2/1899 | Walsh . |
| 1,473,336 | 11/1923 | Connelly . |
| 1,615,586 | 1/1927 | Kleffman . |
| 2,296,507 | 9/1942 | Donaldson ............... 294/904 |
| 2,347,491 | 4/1944 | Lente ............... 114/51 |
| 2,850,316 | 9/1958 | Philibert ............... 294/74 |
| 2,889,167 | 6/1959 | Brawand ............... 280/402 |
| 3,285,443 | 11/1966 | Gaumont ............... 294/904 |
| 3,984,899 | 10/1976 | Northe ............... 294/82.14 |
| 4,270,491 | 6/1981 | Cox ............... 119/109 |
| 4,562,793 | 1/1986 | Simpson ............... 119/153 |
| 4,653,792 | 3/1987 | Sword ............... 294/82.14 |
| 5,064,235 | 11/1991 | Lessard ............... 294/82.14 |
| 5,330,148 | 7/1994 | Floyd ............... 248/499 |
| 5,584,622 | 12/1996 | Dickerson, Sr. ............... 410/21 |

Primary Examiner—Dean Kramer
Attorney, Agent, or Firm—John F. Prescott, Jr.; Ice Miller Donadio & Ryan

[57] ABSTRACT

Disclosed is an improved method for the recovery of motor vehicles submerged in bodies of water. The method comprises the steps of providing a noose comprising a length of material having a first and second end and an intermediate potion between the first and second ends, a slip attached to said first end through which the second end and the intermediate portion pass to thereby form a loop in the noose, and an attachment mechanism attached to the second end; placing the loop in the noose over the exposed portion of a tire and wheel assembly of a vehicle submerged in water such that an axis of an axle connected to the tire and wheel assembly passes through the loop in the noose; attaching the attachment mechanism of the noose to a pulling device; and applying tension to the noose by the pulling device thereby causing the loop in the noose to become smaller and secure itself to the submerged motor vehicle, thereby moving the vehicle. The disclosed invention provides a foolproof method of recovering submerged motor vehicles which can be practiced by rescue and recovery divers quickly, with minimal training, under conditions of zero visibility, and which requires minimal capital investment.

7 Claims, 3 Drawing Sheets

UNDERWATER VEHICLE RECOVERY METHOD

FIELD OF THE INVENTION

This invention relates to a method for the recovery of motor vehicles submerged in bodies of water.

BACKGROUND OF THE INVENTION

Recovery of motor vehicles submerged in bodies of water can be, and often is a very dangerous undertaking. In addition, in those instances when an individual is trapped or is thought potentially to be trapped inside a submerged motor vehicle, a successful and safe recovery of the motor vehicle from the body of water is a matter of the utmost urgency—the undertaking can be and often is literally a life or death situation. Such rescue and recovery operations are frequently the job of fire departments or other emergency medical or rescue and recovery teams. Such departments and teams often call upon divers who may or may not have the benefit of the use of self contained underwater breathing apparatus (SCUBA).

Rescue and recovery operations involving submerged motor vehicles frequently present recovery personnel and divers with very dangerous and challenging underwater environments. For example, a diver attempting to recover a submerged motor vehicle in a river can be faced with having to dive in extraordinarily cold water, very muddy water and/or rapidly running water with dangerous currents and turbulence. Additionally, rescue operations often must be conducted at night or in black water where totally inadequate lighting conditions reduce underwater visibility to zero.

Under such challenging conditions, rescue divers are called upon to locate quickly a submerged motor vehicle and to securely attach some means to that submerged motor vehicle whereby it can be hauled, lifted or towed out of the body of water by some outside source, such as a tow truck or crane positioned at the water's edge. Such rescue divers must work quickly and do the job right the first time. The saving of a human life might not permit a failed first attempt.

Despite the recognized need for a simple, foolproof system for rescue divers to use in the recovery of submerged motor vehicles, no such system exists. Presently, rescue and recovery divers called upon to retrieve submerged motor vehicles have no choice other than to try to wrap a steel tow cable (such as from a tow truck or crane) or the like around a submerged vehicle's axle or major frame component. This is often difficult, however, and sometimes it is impossible. When a motor vehicle submerges in a body of water, depending on the nature of the bed of the body of water, the vehicle may settle quickly such that it is impossible for a diver to obtain adequate access to the underside of the vehicle in order to have direct access to an axle or frame member. Even where such access is not wholly denied to the diver, for the diver to be required to position his body or portions thereof under a vehicle under such conditions exposes the diver to even greater and unacceptable danger. Additionally, debris and refuse on the bed of the lake or river, or even damaged portions of the submerged vehicle can pose a further danger to a diver who, while attempting to work blind and in a hurry, is "feeling around" to find an axle or frame member around which to wrap a steel cable.

Consequently, it would be a substantial advance in the art to have a method for retrieving submerged motor vehicles which requires for its successful operation only that a rescue diver have access to only a little more than the top half of a single tire and wheel assembly of a submerged motor vehicle. Accordingly, a method for recovering a submerged motor vehicle that utilizes a pre-formed noose which can be easily transported to the recovery site and carried under water by the diver, which requires minimum manipulation by the diver, and which can be placed on a tire/wheel assembly of a submerged motor vehicle quickly and under zero visibility conditions will overcome the deficiencies in the prior art.

SUMMARY OF THE INVENTION

A method for recovery of vehicles submerged in water in accordance with the present invention utilizes a noose comprised of a length of suitable material having first and second ends, a slip means connected to the first end, retaining means disposed between the first and second ends and either connected to the length of material or forming an integral part thereof, and attachment means connected to said second end. The slip means is of sufficient size and shape so as to permit the noose material chosen to slide or slip freely therethrough. The retaining means is of a size and shape such that it cannot pass through or become jammed in or on the slip means. The attachment means is of a size and shape such that it cannot pass through or become jammed in or on the slip means. The attachment means is also of a size and shape so as to facilitate quick and simple temporary attachment of said attachment means (and thereby attachment of the noose as a whole) to a pulling means (not part of the present invention) where such pulling means is typically provided by a hook attached to a cable which cable is tensioned by a winch which in turn is typically mounted on a vehicle on the shore of a body of water. The noose is formed by passing the second end of the noose material through the slip means before the attachment means is connected to said second end.

In use, the underwater vehicle recovery noose so formed is placed over at least one tire and wheel assembly of a submerged motor vehicle as appropriate. The portion of the noose on the inboard side of the vehicle's tire and wheel assembly is caused or allowed to fall downward such that it comes to rest on or in close proximity to the vehicle's axle. The portion of the noose on the outboard side of the tire and wheel assembly is caused or allowed to hang or settle down around the lower curved portion of the tire and wheel assembly and, typically, would come to rest upon the bed of the body of water in which the vehicle is submerged.

The attachment means of the noose is connected to the outside pulling means. Tension is then applied to the noose and, as tension is applied, the noose material slips through the slip means and the noose becomes smaller. Because the noose, when in position around the submerged vehicle's tire and wheel assembly, forms a loop with a diameter smaller than the diameter of the tire and wheel assembly it is impossible for the noose to come off. Instead, the noose becomes tighter and tighter around the tire and wheel assembly and in most cases will, upon further tightening, pull itself fully to the inboard side of the tire and wheel assembly and thereby positively secure itself to the vehicle's axle.

Thus, it is a primary object of the present invention to provide a method for the recovery of motor vehicles submerged in a body of water. It is another object of the present invention to provide a method for the recovery of motor vehicles submerged in a body of water which requires access only to a single tire and wheel assembly. It is yet another object of the present invention to provide a method for the recovery of motor vehicles submerged in a body of water which can be used quickly, under zero visibility conditions, and with the utmost safety to the recovery diver.

Additional features and advantages of the present invention will become apparent to those skilled in the art upon consideration of the following detailed description of a preferred embodiment of the invention, exemplifying the best mode of carrying out the invention as presently perceived. The detailed description particularly refers to the following figure in which:

DETAILED DESCRIPTION OF THE PREFERRED EMBODIMENT

Figure 1:
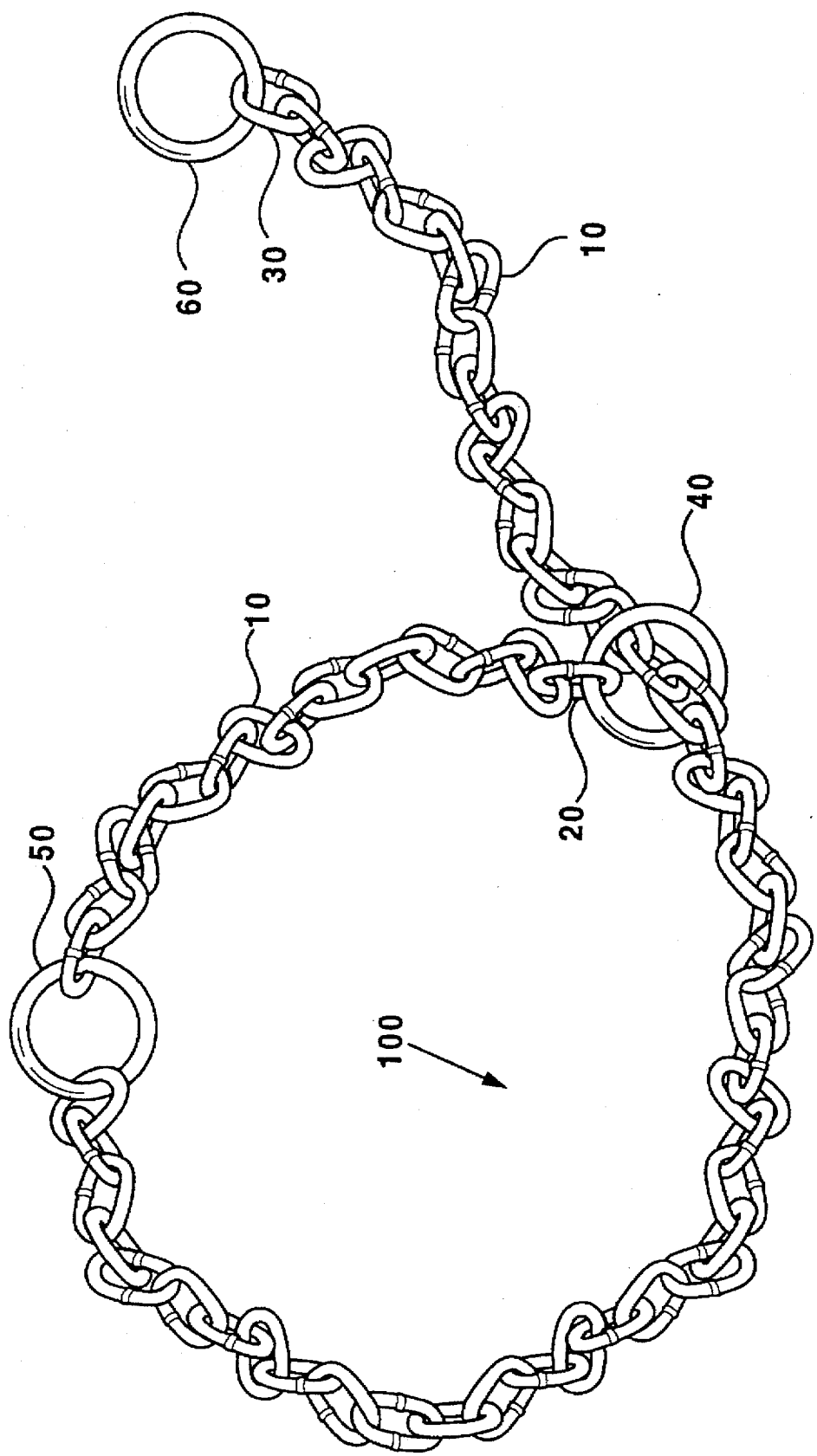
FIG. 1 is a drawing of a noose in accordance with the present invention in which the noose material used is steel chain.

With reference to FIG. 1, a preferred embodiment of the present invention is illustrated. An underwater vehicle recovery noose used in accordance with the present invention comprises a length of suitable material 10 (which may be formed of nylon strap) having a first end 20 and a second end 30. A slip means 40 is provided and is connected to the first end 20. A retaining means 50 is provided and is disposed between the first and second ends by being either connected to the length of material 10 or forming an integral part thereof. Attachment means 60 is provided and is attached to the second end 30. When the noose is being formed, the second end 30 is passed through slip means 40, thereby forming loop 100, before attachment means 60 is attached.

Slip means 40 is chosen to be of a sufficient size and shape so as to permit the chosen noose material 10 to slide or slip freely therethrough. Retaining means 50 and attachment means 60 are each chosen to be of a sufficient size and shape such that neither can pass through or become jammed in or on slip means 40. For example, slip means 40 may comprise a link having a maximum inner dimension (e.g. diameter) less than the minimum exterior dimensions of retaining means 50 and attachment means 60. Attachment means 60 is also chosen to be of a size and shape as to facilitate quick and simple temporary attachment of said attachment means (and thereby attachment of the underwater vehicle recovery noose as a whole) to a pulling means (not shown and not part of the present invention) which pulling means is typically provided by a hook attached to a cable which cable is tensioned by a winch, which winch is itself typically mounted on a vehicle on the shore of a body of water. (For example, a tow truck or crane.)

Figure 2:
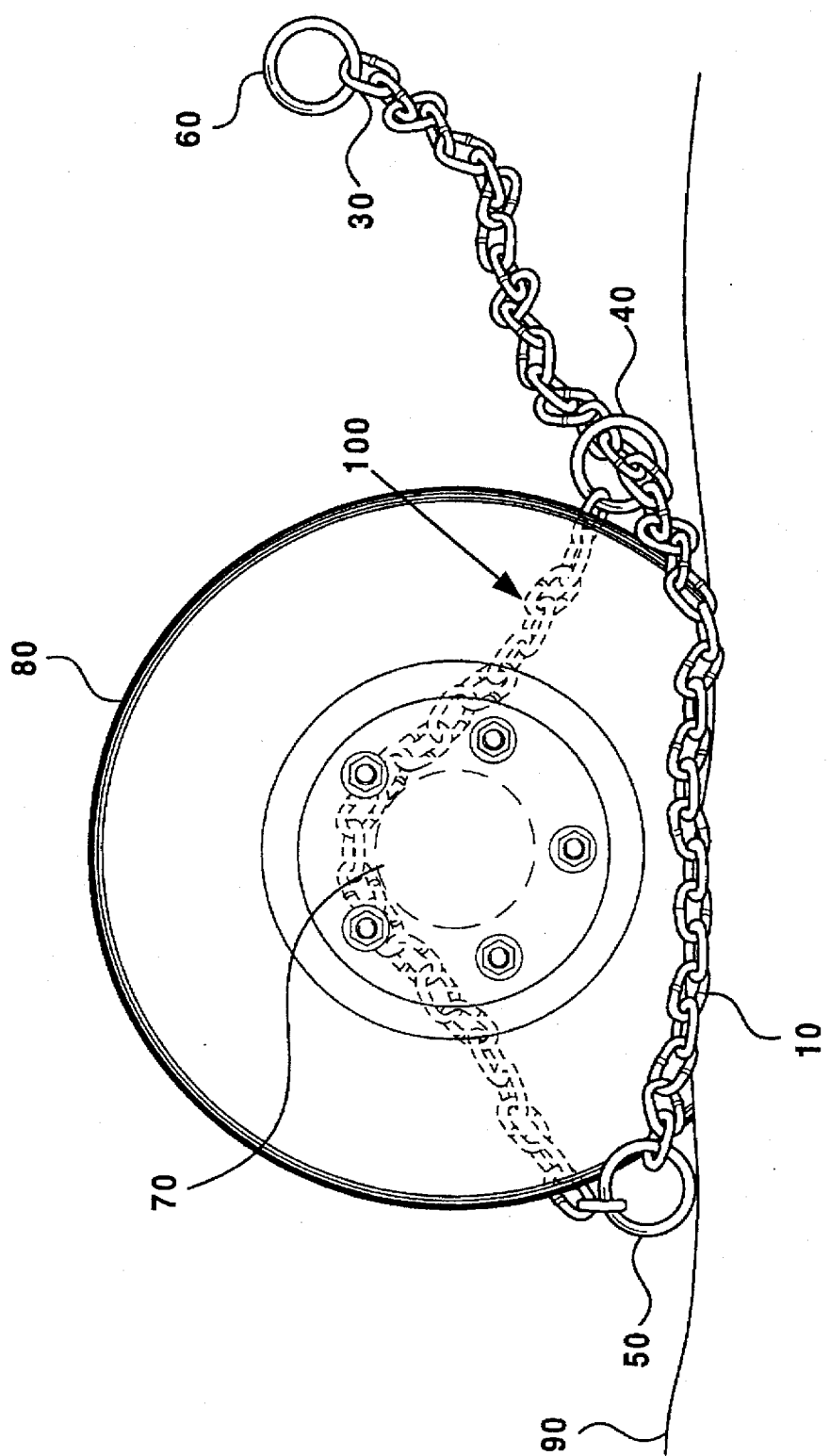
FIG. 2 is an axial view from the outboard side of a tire and wheel assembly of a submerged motor vehicle depicting the placement of an underwater vehicle recovery noose in accordance with the present invention prior to the noose beginning to be tightened.
Figure 3:
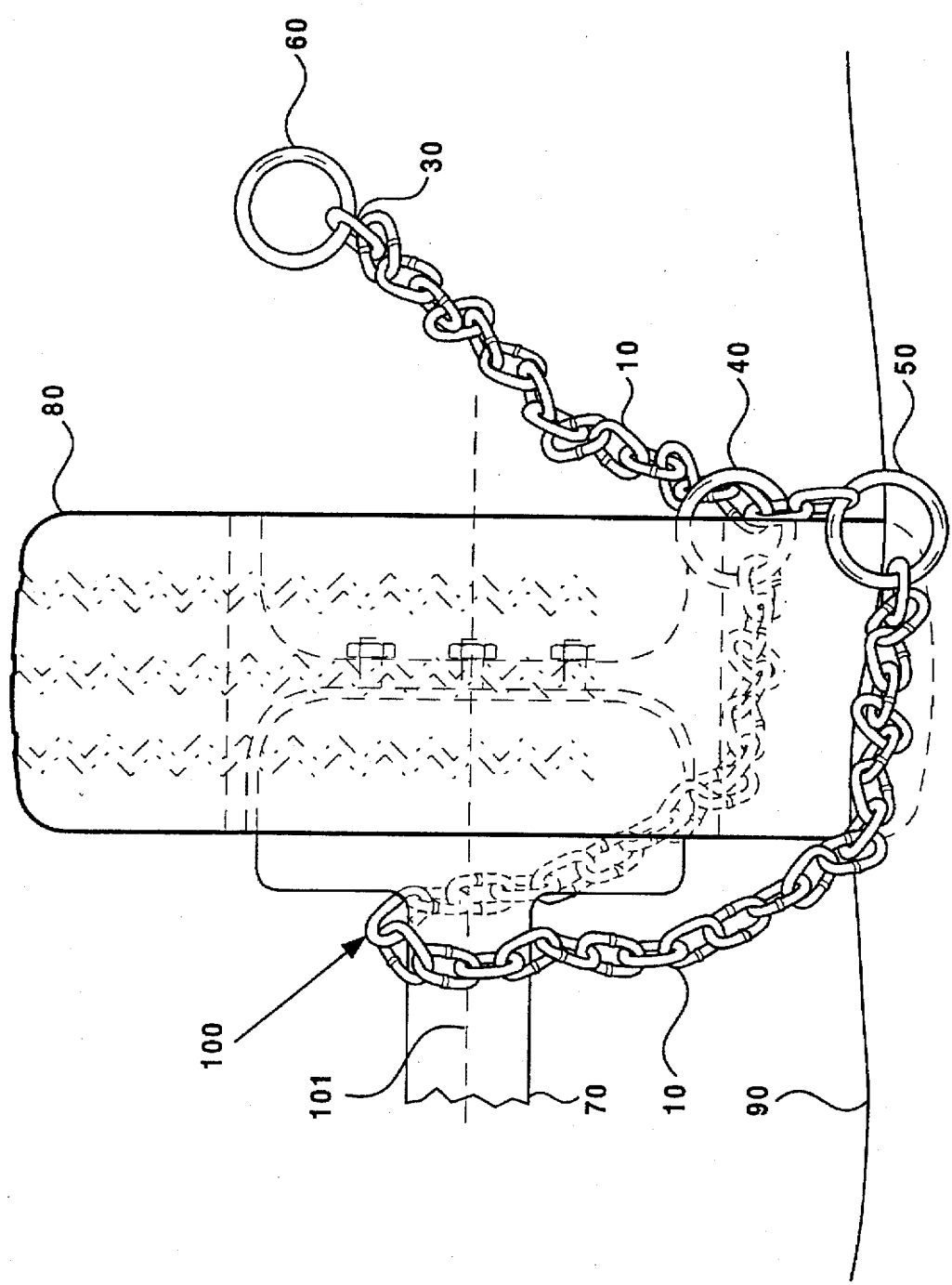
FIG. 3 is a horizontal view perpendicular to an axle of a submerged motor vehicle depicting one tire and wheel assembly and an underwater vehicle recovery noose in accordance with the present invention as placed on the submerged motor vehicle prior to the noose being tightened.

With reference to FIGS. 2 and 3, an underwater vehicle recovery noose is depicted while in the process of being used in accordance with the present invention. The loop 100 of the underwater vehicle recovery noose is placed over the submerged vehicle's tire and wheel assembly 80. The portion of the loop 100 on the inboard side of the tire and wheel assembly 80 is caused or allowed to fall downward such that a portion of loop 100 comes to rest on or in close proximity to the vehicle's axle 70, and an axis 101 of axle 70 passes through loop 100. That portion of the loop 100 on the outboard side of the vehicle's tire and wheel assembly 80 is caused or allowed to hang or settle down around the lower curved portion of the tire and wheel assembly 80 and, typically, will come to rest on the bed of the body of water 90 in which the vehicle is submerged. The attachment means 60 is then connected to an outside pulling means (not shown). Tension is then applied to the noose by the outside pulling means. As tension is applied, noose material 10 slips freely through slip means 40 and loop 100 becomes smaller. Because loop 100, when in position around the submerged vehicle's tire and wheel assembly 80, upon tensioning becomes smaller than the diameter of the tire and wheel assembly, it is impossible for the loop 100 to be pulled free of the vehicle. Instead, the loop 100 simply becomes tighter and because the tire is generally round and subject to deformation, the loop 100 will typically pull itself fully around the bottom side of the tire and wheel assembly 80 and fully to the inboard side of the tire and wheel assembly 80 and around axle 70.

The present invention provides a method for the quick, safe and foolproof recovery of motor vehicles submerged in a body of water. Moreover, the present invention provides a method for the recovery of motor vehicles submerged in a body of water which method requires a minimum of training for rescue and recovery personnel, and a minimal capital investment.

These and other benefits and advantages may be achieved by the present invention as described herein and defined in the appended claims. Further, it should be apparent that various equivalent alterations, changes and modifications to the preferred embodiment may be made without departing from the spirit and scope of the present invention as claimed in appended claims.

I claim:

1. An improved method for recovering a motor vehicle submerged in a body of water comprising the steps of:

(a) providing a noose comprising
      (1) a length of material having a first and second end and an intermediate portion between the first and second ends;
      (2) a slip means attached to said first end through which the second end and the intermediate portion pass to thereby form a loop in the noose; and
      (3) an attachment means attached to said second end;

(b) placing the loop in the noose over the exposed portion of a tire and wheel assembly of a vehicle submerged in water such that an axis of an axle connected to the tire and wheel assembly passes through the loop in the noose;

(c) attaching the attachment means of the noose to a pulling means;

(d) applying tension to the noose by said pulling means thereby causing the loop in the noose to become smaller and secure itself to the submerged motor vehicle, thereby moving the vehicle.

2. The method of claim 1 wherein the noose further comprises a retaining means disposed between said first end and the portion of the intermediate portion that passes through the slip means, said retaining means being shaped so as not to be passable through the slip means.

3. The method of claim 2 wherein the slip means comprises a link having a maximum inner dimension, and wherein the retaining means is larger than said maximum inner dimension.

4. The method of claim 1 wherein the material used to form the noose comprises steel chain.

5. The method of claim 1 wherein the material used to form the noose comprises nylon strap.

6. The method of claim 1, further comprising the step of removing the vehicle from the water.

7. The method of claim 1, wherein a portion of the loop of the noose is in close proximity to the axle when it is placed over the tire and wheel assembly.

* * * * *